United States Patent [19]

Deweese

[11] 4,334,697
[45] Jun. 15, 1982

[54] TORSION BAR SUSPENSION ASSEMBLY

[76] Inventor: Vernon D. Deweese, Rte. 8, Box 664, Joplin, Mo. 64801

[21] Appl. No.: 135,365

[22] Filed: Mar. 31, 1980

[51] Int. Cl.³ .............................................. B60G 21/04
[52] U.S. Cl. .................................... 280/689; 280/665
[58] Field of Search ......................... 280/689, 665, 718

[56] References Cited

U.S. PATENT DOCUMENTS

| 3,165,332 | 1/1965 | Barker, Jr. et al. | 280/689 |
| 4,113,278 | 9/1978 | Rissberger | 280/689 |
| 4,141,428 | 2/1979 | Loeb | 280/718 |

FOREIGN PATENT DOCUMENTS

| 628390 | 10/1961 | Canada | 280/689 |
| 2161058 | 6/1973 | Fed. Rep. of Germany | 280/689 |
| 728397 | 4/1955 | United Kingdom | 280/689 |
| 771745 | 4/1957 | United Kingdom | 280/689 |

Primary Examiner—Joseph F. Peters, Jr.
Assistant Examiner—Ross Weaver
Attorney, Agent, or Firm—D. A. N. Chase; Michael Yakimo, Jr.

[57] ABSTRACT

A vehicle suspension assembly for providing stabilization between the vehicle frame and axle housing comprises a pair of laterally spaced-apart arms with a transversely extending torsion bar joined at the rear ends thereof. The front end of each arm is connected to the axle housing by means of a bracket particularly designed to be sandwiched between the vehicle springs and rear axle housing so as to be concurrently responsive in movement to deflection of the vehicle spring and vertical displacement of the axle housing. Front and rear hinge structures resiliently join the ends of each arm to the bracket and vehicle frame respectively so as to permit yieldable movement to the arm connected therebetween. Presentation of an uneven load to the vehicle causes the flexion of the normal curvature of one or both or the leaf spring assemblies which is transmitted through the associated bracket and arm linked thereto. A resultant force is transmitted along the torsion bar to the opposite arm and associated spring so as to inhibit transverse tilting of the vehicle frame. The resilient hinge structures further aid in smoothness of ride by absorbing road shock transmitted thereto during normal vehicle movement.

8 Claims, 6 Drawing Figures

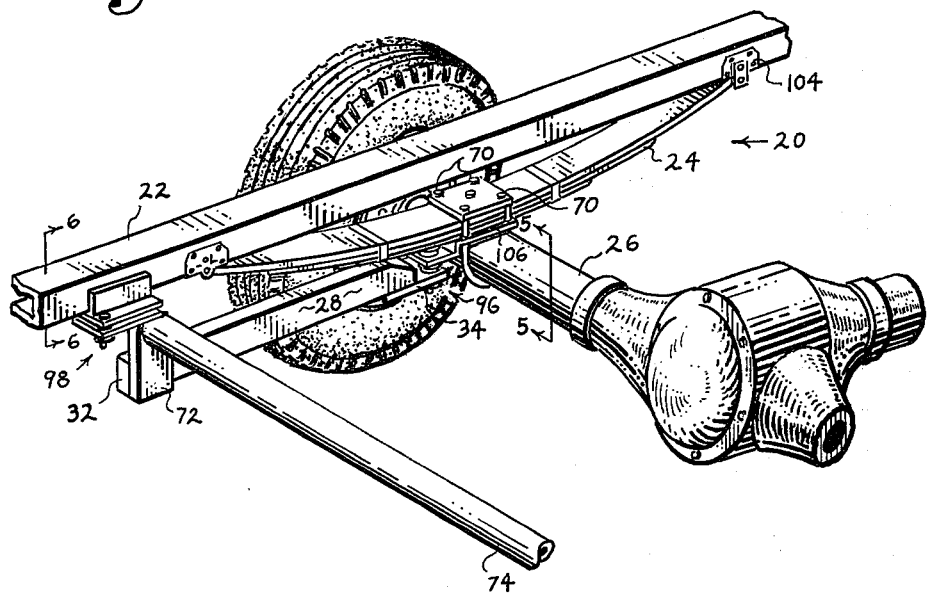
Fig. 1.
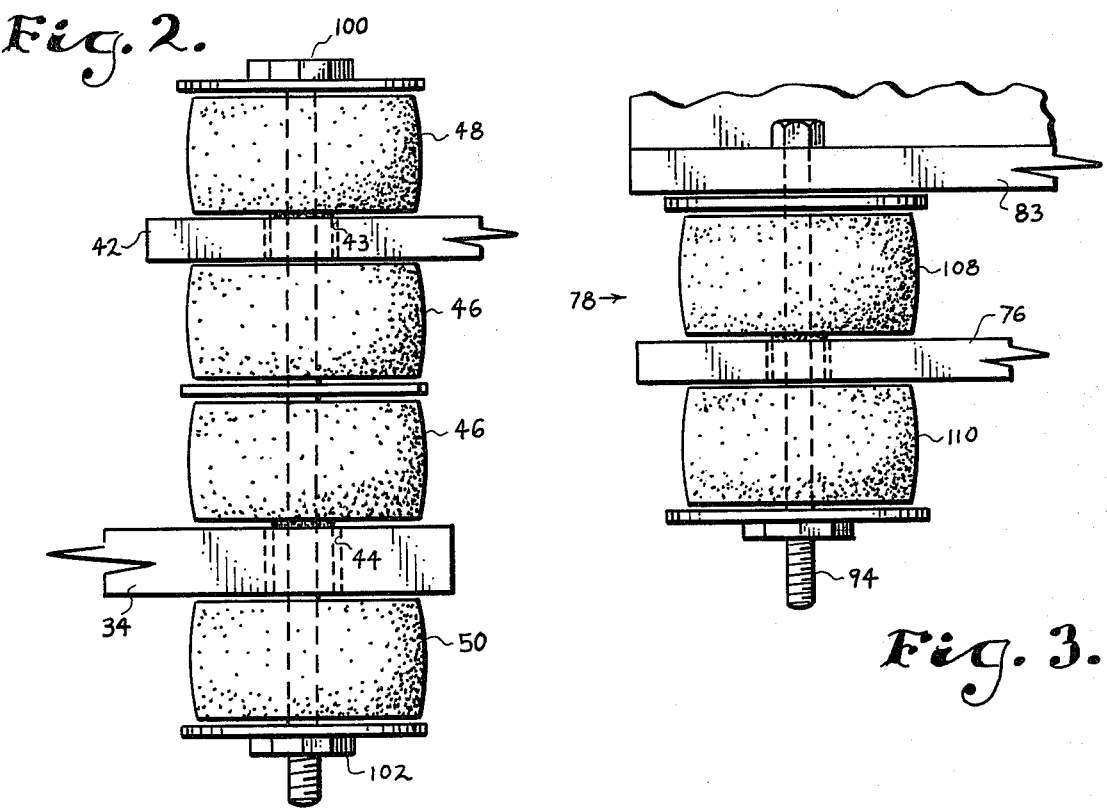
Fig. 2.
Fig. 3.

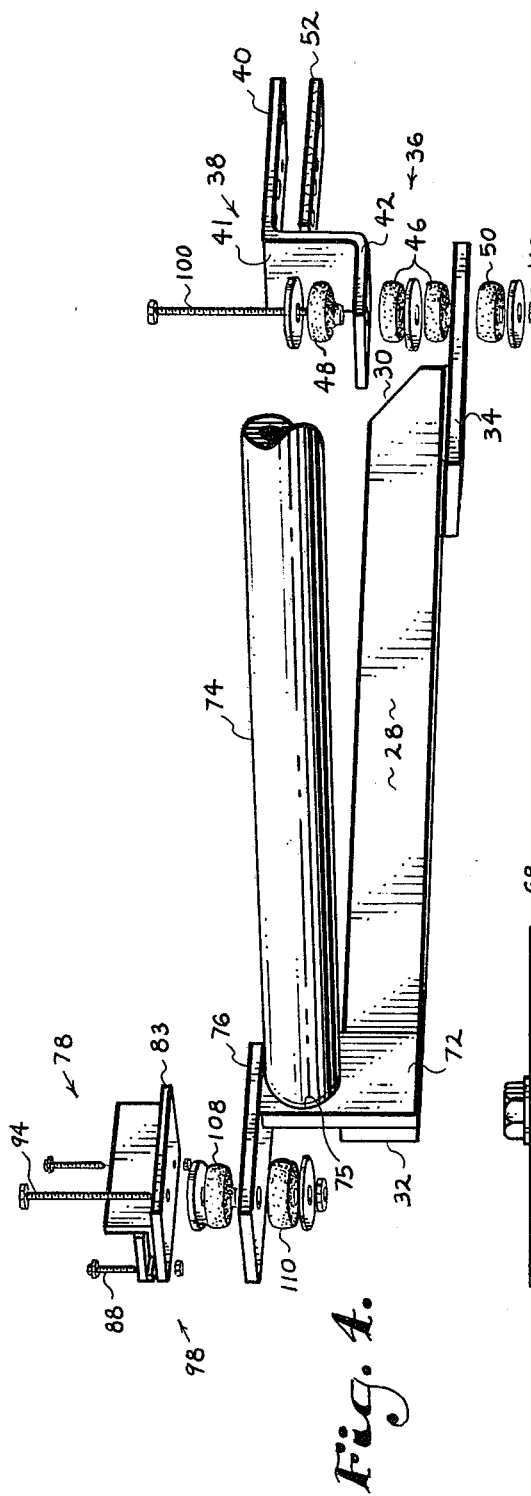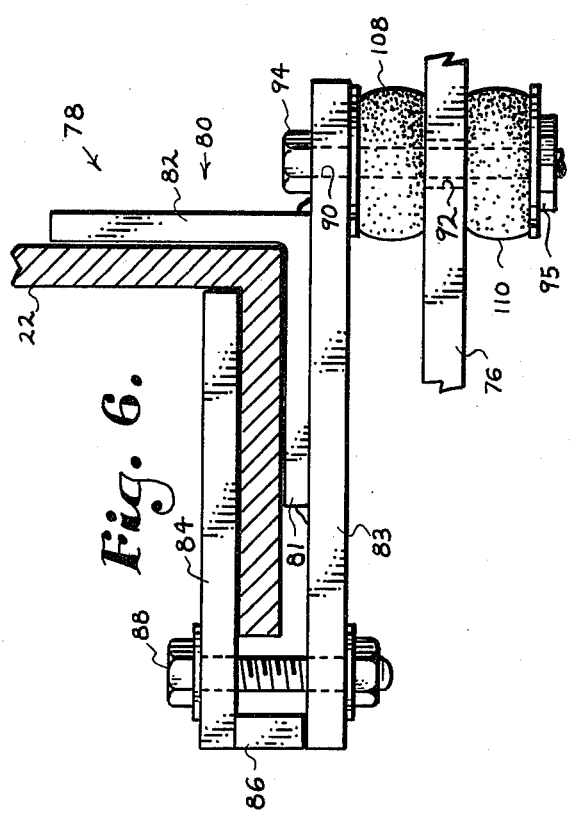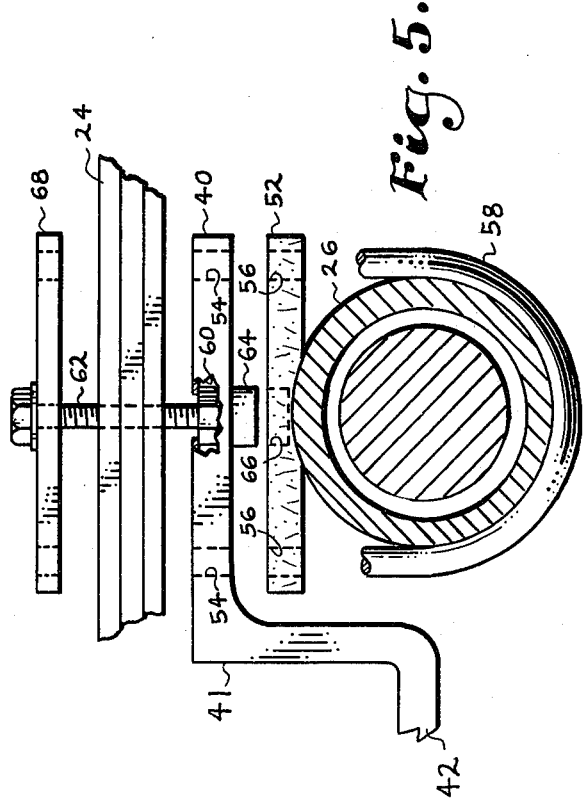

4,334,697

TORSION BAR SUSPENSION ASSEMBLY

BACKGROUND OF THE INVENTION

This invention relates to a suspension assembly and particularly to an assembly designed to monitor critical movement of a vehicle frame and/or axle housing.

In a vehicle, conventional leaf springs are provided which serve to connect the vehicle rear axle housing to the vehicle frame. Occasionally, unequal loads are placed on the vehicle causing uneven loading of the respective leaf springs which in turn causes the vehicle frame to tilt from a desired plane. Such a situation frequently arises in trucks because of their load carrying function and more frequently in those trucks having a boom or derrick mounted thereon which presents an overhung load to the vehicle springs upon swinging the boom or derrick to a selected side.

Accordingly, it is known to provide a stabilizer assembly having a transverse torsion bar joined between two torque arms extending from the respective ends of the torsion bar. The torsion bar in turn is connected to the automobile frame with the free ends of the arms connected to the axle housing.

In operation of known assemblies an external force on a wheel through the leaf spring is transmitted along the axle housing to the junction of the arm and the axle housing and thus produces a torque about the longitudinal axis of the torsion bar. This torque produces a compensating force along the opposite arm so as to produce a similar vertical displacement on the opposite wheel relative to the frame. Accordingly, tilting of the frame from a desired plane is inhibited by such a compensating force. It can be seen that concurrent application of equal forces to the wheels and/or springs provides compensatory forces of a generally cancelling effect.

Problems have arisen in the use of such systems including a desire to have a suspension assembly which not only addresses the maintenance of the vehicle frame attitude, but also functions as an overload device to resist the displacement of the chassis during normal vehicle motion. Also, attempts have been made to negate forces produced along the axle housing during acceleration of the vehicle and transmitted to the suspension assembly which decrease its effectiveness. Such basic problems have been addressed by the use of relatively complex and expensive structures for attachment to the rear axle assembly and vehicle frame. Although somewhat effective in their operation, such structures having received limited acceptance.

A consideration in these assemblies, heretofore not particularly addressed, is the juncture formed at the connection of the rear axle housing and the leaf spring so as to join the axle housing to the vehicle frame. This juncture is of importance, as the movement of the rear axle, and more particularly, deflection of the normal curvature of the leaf spring is a critical indicator of the displacement between the vehicle frame and rear axle and is thus an ultimate indicator of any external forces which may effect a desired vehicle frame attitude and/or ride. Thus, means for providing a stabilizing device which is directly and concurrently responsive to the deflection of the leaf spring, as well as displacement of the axle housing is particularly warranted.

Known devices have not been enmeshed into this leaf spring/axle housing juncture, but have been displaced either vertically or laterally therefrom. Lateral displacement of the torque arm/axle housing juncture from the spring/axle housing juncture presents a distance along which forces can act and thus produced unwanted forces along the respective torque arms. Such unwanted and unnecessary forces inhibit the optimal functioning of known stabilizer apparatus.

Furthermore, many of the suspension assemblies fail to address the ride of the vehicle when in motion and, in some cases had to be disconnected from the frame when carrying a normal load during normal vehicle movement. Also, during a heavy load condition, the underlying leaf springs are normally stiffened which inhibits the smoothness of vehicle ride.

The present invention provides a means for coupling the forward end of each torque arm to the axle housing by use of a bracket particularly designed to be sandwiched between the rear leaf springs and the axle housing so as to be an effective barometer of spring deflection and axle housing movement. Furthermore, the invention provides means of resiliently mounting the end of the arm to the above bracket and to the vehicle frame which is effective to reduce any lateral strains and stress on the torque arms as well as acts as a supplementary shock absorber to dampen the displacement of the vehicle chassis.

Accordingly, it is a general object of this invention to provide a vehicle suspension assembly which will act to reduce tilting of the vehicle frame when presented with an overhung or an uneven load.

Another object of this invention is to provide an assembly, as aforesaid, which will improve the riding and driving characteristics of the vehicles in which it is installed.

A further object of this invention is to provide a suspension assembly, as aforesaid, having a pair of torque arms and torsion bar therein which is mounted to the vehicle frame and axle housing so as to be directly and concurrently responsive to the vehicle spring deflection and/or axle housing movement.

A particular object of this invention is to provide a suspension assembly, as aforesaid, having a pair of brackets therein, particularly designed to couple the front end of each torque arm to the vehicle spring/axle housing juncture.

Still another particular object of this invention is to provide a means of resiliently linking the ends of the respective torque arms to the vehicle frame and axle housing so as to be yieldable to vertical and lateral forces acting thereon.

Another object of this invention is to provide a suspension assembly, as aforesaid, which will inhibit the lateral movement between the vehicle frame and rear axle housing.

A still further object of this invention is to provide an assembly, as aforesaid, which can be used either with a suspension system employing leaf springs or employing coil or other type of springs.

Another object of this invention is to provide a suspension assembly, as aforesaid, which provides means for offsetting the effects of twisting displacements of the axle housing and unmatched vertical displacements of the vehicle frame.

Still another object of this invention is to provide a suspension assembly, as aforesaid, which is simple in construction, efficient in operation and inexpensive to manufacture and maintain.

Other objects and advantages of this invention will become apparent from the following description taken in connection with the accompanying drawings, wherein are set forth by way of illustration and example a preferred embodiment of this invention.

BRIEF DESCRIPTION OF THE DRAWINGS

FIG. 1 is a rearward perspective view showing one side of the suspension assembly in a mounted position to the vehicle frame and rear axle housing.

FIG. 2 is a fragmentary elevation view, on an enlarged scale, showing the means of linking the torque arm bracket to the front extension plate of the associated arm.

FIG. 3 is a fragmentary elevation view, on an enlarged scale, showing the means of resiliently mounting the rear extension plate of the associated torque arm to the clamping bracket of the vehicle frame.

FIG. 4 is a perspective exploded view, showing one side of the suspension assembly.

FIG. 5 is a partially exploded view, on an enlarged scale, taken along line 5—5 in FIG. 1, showing the means of sandwiching the torque arm bracket between the vehicle rear leaf springs and axle housing.

FIG. 6 is a sectional elevational view, on an enlarged scale, taken along line 6—6 in FIG. 1, showing the means of resiliently mounting the rear end of the torque arm to the vehicle frame.

DESCRIPTION OF THE PREFERRED EMBODIMENT

Referring more particularly to the drawings, FIG. 1 shows the suspension assembly 20 mounted to the vehicle frame 22 with FIG. 4 showing the elements of one side of the suspension assembly 20 in an exploded relationship. It is understood that the assembly 20 is symmetrical in configuration and that only one side of the assembly 20 is shown for ease of illustration.

As shown in FIG. 1, conventional leaf springs 24 have been employed to mount the rear axle housing 26 to the vehicle frame 22 and present a spring/axle housing juncture 106 at the point of connection. The suspension assembly 20 generally comprises first 28 and second (not shown) laterally spaced apart arms with each arm having front 30 and rear 32 ends. Extending from the front end 30 of arm 28 is a front extension plate 34 preferably welded thereto.

Structure generally designated as 36 is used to connect the arm 28 to the juncture 106 of the rear axle housing 26 and leaf spring 24. This structure, generally designated as 36, includes a bracket 38 having generally horizontally extending front 40 and rear 42 plates being vertically and laterally disposed and joined by a vertical riser 41 so as to form a stepped relationship therebetween. The rear extending plate 42 has a central aperture 43 therein for vertical alignment with an aperture 44, of the front extension plate 34 disposed therebelow. A pair of rubber bushings 46 are sandwiched between the aligned rear plate 42 and front extension plate 34. Rubber bushing 48 is positioned atop the rearwardly extending plate 42 and is partially countersunk into aperture 43. Another rubber bushing 50 is positioned below the front extension plate 34 and partially countersunk into the aperture 44 therein. Bolt 100 is passed through the vertically aligned apertures 43 and 44 of the respective plates 42 and 34. Upon fastening of nut 102 thereto, a resilient means for linking the front end 30 of arm 28 to the rear plate 42 of bracket 38 is established as well as a hinge point for movement therebetween.

Associated with the axle housing 26 is a spring mounting pad 52 preferably congruent in configuration to that of the front plate 40. A series of U-bolt apertures therein 54 and 56 are located at the corners of the front plate 40 and pad 52 and are vertically aligned for receiving conventional U-bolts 58 therethrough. Recess 60 in front plate 40 receives the head of the rear leaf spring centering bolt 62 therein for a swivel type registration therebetween. Extending from the bottom surface of the plate 40 is a nipple 64 for registration in an aligned recess 66 appearing in the spring mounting pad 52. Upon registration between the nipple 64 and the mounting pad recess 66, centering bolt 62 is registered into recess 60. U-bolts 58 extending around the axle housing 26 and through the pad 52 and front plate 40 are then secured to the leaf spring clamping plate 68 by nuts 70. Upon tightening of the nuts 70 the front plate 40 of bracket 38 is in a sandwiched relationship between the rear leaf springs 24 and the axle housing 26 with the leaf springs 24 performing the normal function of joining the vehicle frame 22 to the rear axle housing 26.

The rear end 32 of arm 28 has a vertical flange 72 welded to the inside thereof with an end of torsion bar 74 received into aperture 75 and welded thereto. Atop flange 72 is a horizontal, rearwardly projecting rear extension plate 76 designed for connection to the vehicle frame clamping bracket 78.

As shown in FIG. 6, the vehicle frame clamping bracket 78, mounted behind the rear spring hanger bracket 104 comprises an angle iron 80 having horizontal 81 and vertical 82 legs with a horizontally disposed plate 83 welded to horizontal leg 81 at the underside thereof. A horizontally disposed clamping plate 84 is provided having a downwardly extending spacer 86 abutting the plate 83 when positioned about the vehicle frame 22, as shown in FIG. 6. The respective plates 83 and 84 are joined together about the vehicle frame 22 by bolt/nut combination 88. Bushing 108 is placed between plate 83 and rear extension plate 76 with bushing 110 placed below the rear extension plate 76. The bushings 108 and 110 are aligned with apertures 90 and 92 in the respective plates 83 and 76 and receive a bolt 94 therethrough. Upon tightening of nut 95 a hinge point 88 is established between the vehicle frame 22 and rear end 32 of arm 28 which provides a resilient connection therebetween.

As above mentioned, the structure of assembly 20 has been described with reference to the driver side of the vehicle with the other side not being shown. It is understood that identical structure appears on the other side. Although described in reference to a powered vehicle, it is also understood that such an assembly can be used in a trailer or the like with the rear axle housing not necessarily containing complex running gear therein.

In operation, bracket 38, as sandwiched between the rear leaf spring 24 and axle housing 26 at their juncture 106, must necessarily respond to any vertical displacement of the leaf spring 24 and/or axle housing 26 appearing at this juncture 106. Such movement is transmitted through the bracket 38 to the respective arm 28 by the linking of the rear plate 42 of the bracket 38 to the front extension plate 34 of the arm 28 as previously described and shown in FIG. 2. Any vertical movement at the spring/axle housing juncture 106 is accordingly transferred along the arm 28 resulting in a torque force along torsion bar 74 for a further transference to the opposite arm 28' (not shown). Action on arm 28 through its associated structure 36' (not shown) produces a vertical displacement at the opposite spring-/axle housing juncture which inhibits transverse tilting of the vehicle frame 22 during an unbalanced load condition.

Furthermore, the connection of the mounting bracket 38 at the point of the spring/housing juncture 106 precludes the transference of any forces to the suspension assembly 20 which do not act through this juncture 106 and thus have no effect on the attitude of the vehicle frame 22.

Consideration has also been given to lateral forces acting on the leaf spring 24 and/or axle housing 26 which may cause a lateral shifting of the vehicle frame 22 relative to the axle housing 26. A swivel point is presented upon registration of the centering bolt 62 with recess 60 as bolt 62 is pivotably seated therein. This swivel allowance allows the centering bolt 62 to rotate slightly about its longitudinal axis. Accordingly, this swivel allowance inhibits the undesirable transference of lateral forces to the associated bracket 38 and arm 28 primarily due to a lateral movement of spring 26. The registration of plate 40 with the spring mounting pad 52 allows yieldable movement of the pad 52 upon action of lateral forces thereon. Such yieldable movement is effective in diminishing the transference of forces to the bracket 38 primarily due to lateral movement of the axle housing 26.

Also, the resilient connection of the front 30 and rear 32 ends of the frame arm 28 to the bracket 38 and frame 22 respectively establishes first and second hinge points designated as 96 and 98 at those respective junctures. Thus, a vertical displacement of the vehicle frame during normal vehicle motion provides a movement of the arm 28 to resist the relative displacement of the frame 22 with respect to the axle housing 26. Such a resistance allows these hinge point structure 96 and 98 and the arm 28 therebetween to function as a dampener to lessen road shock during normal vehicle travel. Furthermore, the establishment of these hinge points 96 and 98 permits yieldable lateral movement of the front 30 and rear 32 ends of arm 28 which decreases stresses or strains on the arm 28 and undesirable arm movement in the lateral direction.

Having then described the invention, what is claimed as new and desired to be secured by Letters Patent is:

1. In a vehicle having a pair of laterally spaced-apart wheels, an axle housing interconnecting said wheels, a vehicle frame, a pair of spring means connected to said frame and contiguous to said axle housing at the lateral ends thereof, a vehicle suspension assembly comprising:
first and second laterally spaced-apart arms with each arm having front and rear ends, said arms being vertically disposed below said frame;
a torsion bar transversely extending between said arms and joined thereto at said rear ends thereof;
means for linking said rear end of each arm to said vehicle frame to provide a transverse extension of said joined torsion bar below said vehicle frame;
a bracket responsive to movement of said associated spring means and axle housing for connecting said front end of each arm to the corresponding juncture presented by said connection of said spring means and said axle housing;
means in each bracket for sandwiching a portion thereof between said contiguous axle housing and said spring means and including:
a generally horizontal plate interposed between said adjacent spring means and said axle housing, said interposed plate member being configured to minimize the vertical displacement of said initially contiguous spring means and axle housing;
a generally vertical bolt passing through each of said spring means near the longitudinal center thereof;
a recess in said plate for receiving an end of said bolt, said recess being configured to receive a bolt end in a swivel type registration about its longitudinal axis in response to lateral forces acting on said associated spring means,
said interposed horizontal plate responsive to vertical displacement of said juncture of said adjacent spring means and said axle housing and cooperating with said associated swivel bolt whereby to transfer a vertical displacement of said juncture to said arms while inhibiting transference of lateral displacement of said spring means to the same.

2. The device as claimed in claim 1, wherein said sandwiching means further comprises:
a spring mounting pad for placement between said horizontal plate of said bracket and said axle housing;
a nipple projecting from the opposed surface of said plate relative to said recess, said nipple in alignment with said recess;
said spring mounting pad having an aperture therein for registration with said nipple, said registration providing a yieldable movement of said bracket upon action of lateral forces thereon to inhibit transference of said lateral forces to said connected arm.

3. The device as claimed in claim 1, further comprising means for establishing a hinge point between each of said arms and corresponding bracket, said respective hinge point means comprising:
a generally horizontal member associated with said bracket and extending away from said axle housing towards said front end of said arm;
a front extension plate projecting from said front end of said respective arm and placed in a vertically disposed relationship relative to said horizontal bracket member;
a pivot member for linking said horizontal bracket member to said front extension plate, said linked pivot member providing a yieldable lateral movement between said front arm extension plate and said bracket horizontal member so as to inhibit stresses and strains acting thereon.

4. The device as claimed in claim 3, further comprising:
resilient means connecting said respective horizontal bracket member and said front extension plate, whereby said resilient means dampens up and down motion between said horizontal bracket member and said front extension plate so as to absorb road shock during vehicle travel.

5. The device as claimed in claim 1 or 3, further comprising means for establishing a hinge point between each of said arms at said respective rear end thereof and said vehicle frame, said vehicle frame hinge point means respectively comprising:
a bracket mounted to said vehicle frame and having a generally horizontal member therein extending towards the interior of said vehicle frame;
a rear extension plate projecting from said rear end of said respective arm and placed in a vertically disposed relationship relative to said horizontal member of said vehicle frame bracket;

a pivot member for linking said horizontal member of said vehicle frame bracket to said rear extension plate, said linked pivot member providing a yieldable lateral movement to said rear arm extension plate so as to inhibit stresses and strains acting thereon.

6. The device as claimed in claim 5, further comprising:

resilient means connecting said respective horizontal member of said vehicle frame bracket and said rear extension plate, whereby said resilient means dampens up and down motion between said horizontal member of said vehicle frame bracket and said rear extension plate so as to absorb road shock during vehicle travel.

7. The device as claimed in claim 1, wherein said bracket comprises:

a first generally horizontal plate member;

a second generally horizontal plate member disposed below said first plate member;

a vertical riser bridging said first and second plates to present a stepped relationship therebetween;

said first plate member providing said bracket sandwiched portion between said axle housing and said spring means with said second plate member providing structure for linking said bracket to said arm.

8. The device as claimed in claim 1 wherein said spring means is in an overhead position relative to said axle housing.

* * * * *